United States Patent
Su et al.

(10) Patent No.: US 9,911,178 B2
(45) Date of Patent: Mar. 6, 2018

(54) SYSTEM AND METHOD FOR CONTENT-ADAPTIVE SUPER-RESOLUTION VIA CROSS-SCALE SELF-LEARNING

(71) Applicant: Samsung Electronics Co., Ltd., Suwon-si (KR)

(72) Inventors: Chang Su, Mountain View, CA (US); Li Tao, Mountain View, CA (US)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/050,218

(22) Filed: Feb. 22, 2016

(65) Prior Publication Data

US 2016/0343109 A1  Nov. 24, 2016

Related U.S. Application Data

(60) Provisional application No. 62/233,172, filed on Sep. 25, 2015, provisional application No. 62/165,744, filed on May 22, 2015.

(51) Int. Cl.

| | |
|---|---|
| *G06K 9/62* | (2006.01) |
| *G06K 9/66* | (2006.01) |
| *G06T 3/40* | (2006.01) |
| *G06T 5/00* | (2006.01) |
| *G09G 5/30* | (2006.01) |

(Continued)

(52) U.S. Cl.
CPC ............ *G06T 3/4053* (2013.01); *G06T 5/00* (2013.01); *G09G 5/30* (2013.01); *H04N 7/0125* (2013.01); *G09G 5/00* (2013.01); *G09G 2340/0407* (2013.01)

(58) Field of Classification Search
None
See application file for complete search history.

(56) References Cited

U.S. PATENT DOCUMENTS

| | | |
|---|---|---|
| 8,649,636 B2 | 2/2014 | Sakaguchi et al. |
| 8,929,662 B2 | 1/2015 | Park et al. |
| 2007/0257944 A1 | 11/2007 | Miller et al. |

(Continued)

OTHER PUBLICATIONS

"List of True 16:9 Resolutions" updated Jan. 20, 2013 @ http://web.archive.org/web/20140216043821/http://pacoup.com/2011/06/12/list-of-true-169-resolutions/.*

(Continued)

*Primary Examiner* — Yingchun He

(57) ABSTRACT

A display system converts Full-High Definition (FHD) image content into Ultra-High Definition (UHD) image content. The display system includes an interface that provides image content to a display having a first resolution. The display system also includes a processor that converts an input image from a second resolution to the first resolution. The first resolution is greater than the second resolution. The processor generates a first value corresponding to a lost high-frequency component (HFC) of the input image; generates an initial component of an output image; selects a patch of the input image; estimates a lost HFC of the patch of the initial component based on a portion of the lost HFC of the input image that corresponds to the selected patch; and generates the output image based on a sum of the patch of the initial component and the estimated lost HFC of the patch of the initial component.

20 Claims, 9 Drawing Sheets

(51) Int. Cl.
*H04N 7/01* (2006.01)
*G09G 5/00* (2006.01)

(56) References Cited

U.S. PATENT DOCUMENTS

| | | |
|---|---|---|
| 2010/0027914 A1 | 2/2010 | Terada et al. |
| 2012/0086850 A1* | 4/2012 | Irani ............... G06T 3/4053 348/441 |
| 2012/0188368 A1 | 7/2012 | Shechtman et al. |
| 2012/0328210 A1* | 12/2012 | Fattal ............... G06T 3/403 382/264 |
| 2013/0034271 A1 | 2/2013 | Sakaguchi et al. |
| 2013/0242138 A1 | 9/2013 | Becker-Lakus et al. |
| 2013/0329098 A1 | 12/2013 | Lim et al. |
| 2014/0355693 A1 | 12/2014 | Chen et al. |
| 2015/0093045 A1 | 4/2015 | Turkan et al. |

OTHER PUBLICATIONS

R. Timofte, V. D. Smet, L. V. Gool, K. Leuven, and E. Zurich, "Anchored neighborhood regression for fast example-based super-resolution," in Int. Con. on Computer Vision. Sydn.

R. Timofte, V. D. Smet, and L. V. Gool, "A+: Adjusted anchored neighborhood regression for fast super-resolution," in Asian Conf. on Computer Vision, Singapore, Nov. 2014, pp.

D. Glasner, S. Bagon, and M. Irani, "Super-resolution from a single image," in Int. Conf. on Computer Vision. Kyoto, Japan: IEEE, Sep. 2009, pp. 349-356.

* cited by examiner

SYSTEM AND METHOD FOR CONTENT-ADAPTIVE SUPER-RESOLUTION VIA CROSS-SCALE SELF-LEARNING

CROSS-REFERENCE TO RELATED APPLICATION(S) AND CLAIM OF PRIORITY

This application claims priority under 35 U.S.C. § 119(e) to U.S. Provisional Patent Application No. 62/165,744 filed on May 22, 2015 and entitled "CONTENT-ADAPTIVE REAL-TIME SINGLE-IMAGE SUPER-RESOLUTION WITH ADAPTIVE SUPPORTED WINDOW BASED IN-PLACE SELF LEARING"; and to U.S. Provisional Patent Application No. 62/233,172 filed on Sep. 25, 2015 and entitled "REAL-TIME SINGLE IMAGE SUPER-RESOL-TUION ALGORITHMS". The above-identified provisional patent applications are hereby incorporated by reference in its entirety.

TECHNICAL FIELD

This disclosure relates generally to image processing. More specifically, this disclosure relates to content-adaptive super-resolution via cross-scale self-learning.

BACKGROUND

Ultra-High Definition (UHD), also known as Super-Hi Vision in some countries, is a display format having a 16:9 ratio with at least one digital input cable carrying a minimum resolution of 3,840×2,160 pixels. Recently, UHDTVs have become commerically available in market. UHD content is not has prevalent and the lack of UHD contents has becomes an important obstacle that constrains the further development of the UHD markets, inhibiting a popularity of UHDTVs. The fast growing UHD products, such as UHDTVs, lack UHD content due to the high-cost of UHD imaging systems and requirments for a huge restoration medium. Currently, most image/video contents available in broadcasting fields are Full-high Definition (FHD) or even Standard Definition (SD). For example, massive FHD content has existed in broadcasting industries for a long time. The FHD content, however, cannot be effectively used by the UHD products. When displayed by UHD devices, the FHD content must be upsampled to a UHD format. A visual quality of the upsampled images from FHD images are generally degraded by blur and image-detail loses.

SUMMARY

This disclosure provides a system and method for content-adaptive real-time single-image super-resolution via cross-scale high-frequency component self-learning.

In a first embodiment, an apparatus is provided. The apparatus includes a display device interface configured to provide image content having a first resolution to a display device having a display resolution greater than the first resolution. The apparatus also includes one or more processors configured to convert an input image from the first resolution to a second resolution. The second resolution is greater than the first resolution. To convert the input image from the first resolution to the second resolution, the one or more processors is configured to generate a first value corresponding to a lost high-frequency component (HFC) of the input image. The one or more processors are also configured to generate an initial component of an output image. The one or more processors are also configured to select a patch of the input image. The one or more processors is also configured to estimate a lost HFC of the patch of the initial component as a function of a portion of the lost HFC of the input image that corresponds to the selected patch. The one or more processors are further configured to generate the output image as a function of a sum of the patch of the initial component and the estimated lost HFC of the patch of the initial component.

In a second embodiment, a non-transitory computer readable medium embodying a computer program is provided. The computer program, when executed by a processor, causes the processor to convert an input image from a first resolution to a second resolution. The second resolution is greater than the first resolution. To convert the input image from the first resolution to the second resolution, the computer program, when executed by a processor, further causes the processor to generate a first value corresponding to a lost high-frequency component (HFC) of the input image. The computer program also causes the processor to generate an initial component of an output image. The computer program also causes the processor to select a patch of the input image. The computer program also causes the processor to estimate a lost HFC of the patch of the initial component as a function of a portion of the lost HFC of the input image that corresponds to the selected patch. The computer program further causes the processor to generate the output image as a function of a sum of the patch of the initial component and the estimated lost HFC of the patch of the initial component.

In a third embodiment, a method for converting image content is provided. The method includes obtaining an input image for conversion from a first resolution to a second resolution. The second resolution is greater than the first resolution. The method includes generating a first value corresponding to a lost high-frequency component (HFC) of the input image. The method also includes generating an initial component of an output image. The method also includes selecting a patch of the input image. The method also includes estimating a lost HFC of the patch of the initial component as a function of a portion of the lost HFC of the input image that corresponds to the selected patch. The method further includes generating the output image as a function of a sum of the patch of the initial component and the estimated lost HFC of the patch of the initial component.

Other technical features may be readily apparent to one skilled in the art from the following figures, descriptions, and claims. Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device, static RAM, dynamic RAM, or flash memory.

Various functions described below can be implemented or supported by a processor coupled to a computer readable medium storing one or more computer programs. As such, the processor is a special purpose processor for performing the functions defined by the one or more computer programs.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
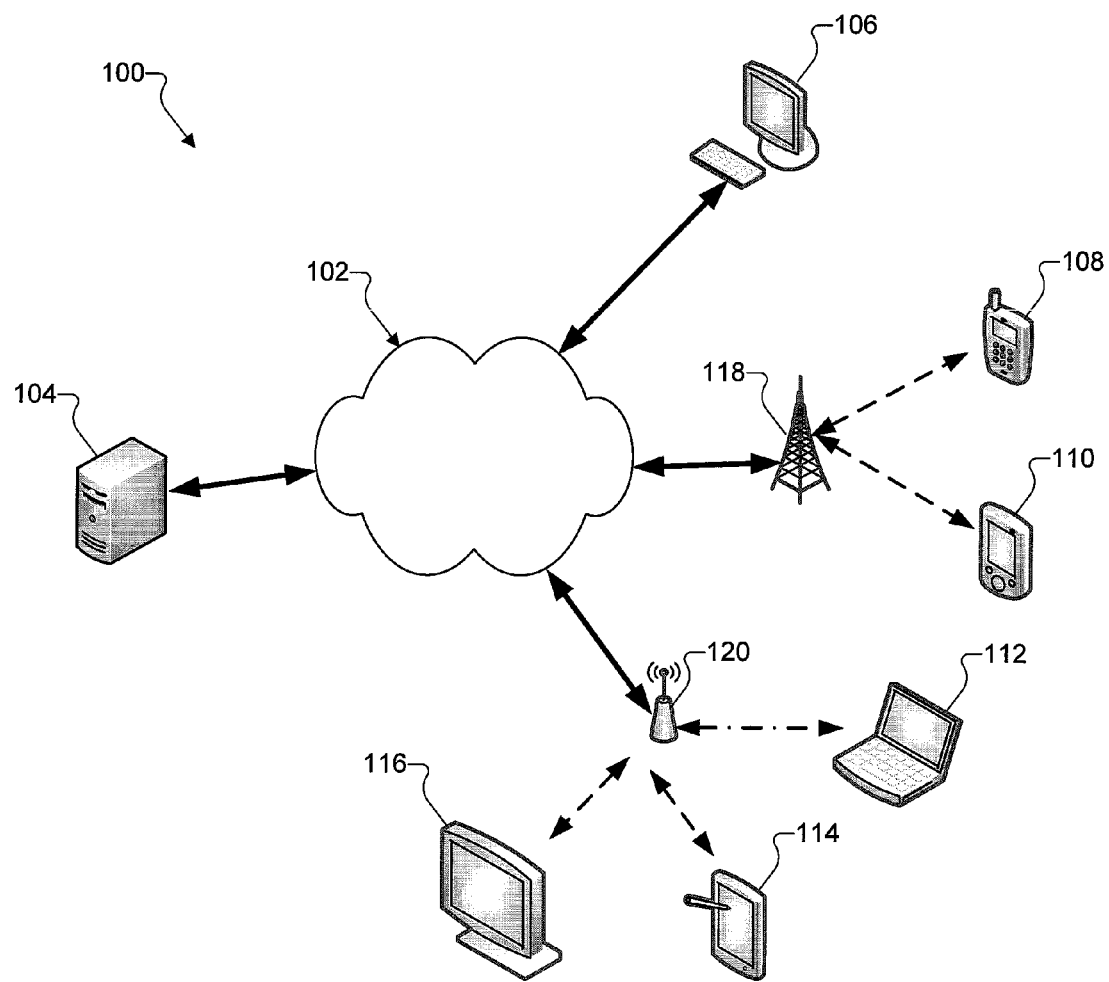
FIG. 1 illustrates an example computing system 100 according to an embodiment of this disclosure.

FIGS. 1 through 11, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system. Certain embodiments are described in the context of up-conversion for ultra-high definition televisions (UHDTVs). Embodiments including up-conversion for any suitable display device and up-conversion from any first resolution to any suitable second resolution could be used without departing from the scope of the present disclosure.

As the ultra-high definition (UHD) products, such as UHDTVs, are more and more popular in the broadcasting markets, a lack of UHD contents has becomes an obstacle that constrains the further development of the UHD markets. Thus far, most image/video contents available in broadcasting fields are full-high definition (FHD) content or standard definition (SD) content. Without a high-performance image up-scaler, the visual quality will be greatly decreased when displaying FHD content or SD content on an UHD device due to the loss of high-frequency components (HFC). For example, when FHD images are displayed on UHDTVs, the FHD images do not look as sharp as the FHD images appear as real UHD images. Thus far these UHD shooting systems are relatively expensive and require large bandwidth or large memory storage. In addition, the contents that are originally made with the UHD format are still far away enough for the fast developing UHD broadcasting markets.

Interpolation based upsampling methods cannot fix the problem since they are not capable of recovering HFC. Additionally, super-resolution (SR), which may either be multi-frame reconstruction based (RB) or example-based (EB), is a method that can be used to implement FHD-UHD conversion. These algorithms can be difficult to apply in practice, or may not obtain high enough visual quality in up-sampled images.

SR methods can multi-image based, which recover at least some of the HFC by 1) content registration, 2) initial interpolation, and 3) image restoration. These algorithms can have constraints in real-world applications. First, sub-pixel level motions must exist among input images. Second, the methods can be very sensitive to the errors in content registration. Registration errors, even small errors, may lead to high visual impacts in the final results. In addition, due to the complexity of real-world contents, it can be difficult or even impossible to perform a 100% accurate registration. Third, iteration based image restorations are adopted in a number of those methods, such as an iterative back-projection (IBP) algorithm. The iteration based restorations may effectively improve the visual quality of the up-sampled images, but may be computationally expensive and time-consuming, and not suitable for hardware implementations.

Example-based super resolution (EBSR) techniques are another image up-sampling approach. The EBSR techniques can effectively recover considerable HFC from the input images, and obtain relatively high visual quality in the up-sampled images. However, adopting EBSR in broadcasting applications has been difficult. First, the contents of the up-sampled images obtained by the EBSR are not the real contents of the input images. The up-sampled images are synthesized from a pair of contents dictionary, which contain the corresponding low frequency (LF) and high frequency (HF) contents. Bias-trained dictionaries may lead to serious distortions in the up-sampled images. Second, offline training is not suitable for real-time applications. Third, the LF/HF dictionary pair imposes a large burden to hardware implementations. An EBSR based product may require a substantial memory buffer to store the dictionary pair. This significantly increases the cost of the product. Finally, many EBSR algorithms are iteration based. For example, sparse representation can be used in EBSR. This may not be suitable for hardware implementation. An EBSR approach can be high-efficiency and non-iteration but require huge memory buffers to store both dictionaries and pre-computed projection matrixes. Accordingly, these EBSR approaches may not be suitable for real-world applications.

Certain embodiments of the present disclosure of the present disclosure provide an image-processing algorithm in the form of a content-adaptive real-time single-image super-resolution via cross-scale high-frequency component self-learning (CARTS). Certain embodiments of the present disclosure provide a system and method capable of recovering enough HFC from the input images to obtain sharp and natural up-sampled images with high visual quality, among other effects. Certain embodiments of the present disclosure provide an apparatus robust enough to different image contents to obtain naturally up-sampled contents without high visual impacts. Certain embodiments of the present disclosure provide an apparatus, system and method that are suitable for a large class of hardware implementations.

Embodiments of the present disclosure can utilize several concepts. The first example concept is that the HFC that may be unrecoverable during up-sampling can be estimated from the original input images themselves, and another example concept is that image contents have great redundancy in the same image or between different scales of the image. Unlike the extensively researched EBSR algorithms, which obtain the correspondence between LF contents and their HF counterparts by massive offline training, embodiments of the present disclosure provide an apparatus that learns the LF-HF correspondence from input images themselves. In certain embodiments, no dictionary is required in the CARTS apparatus, thus CARTS is configured to save system resources and greatly decrease implementation cost. In contrast to other self-learning SR algorithms that adopt online learning strategies to build LF-HF correspondence, in which the learning strategies are mostly iteration based and computationally expensive, and also unlike the EBSR, which synthesizes the up-sampled image contents from dictionary atoms, embodiments of the present disclosure synthesize up-sampled contents from the input images. That is, certain embodiments effectively avoid the case that no dictionary atom can well synthesize some real-world image contents.

Certain embodiments model a sharp and clear (blur-free) UHD image including two parts. One is the base layer containing basic structures and regions; the other is detail layer containing HFC. In FHD-UHD conversion applications, the CARTS regards the initial component, such as an initial guess, of an UHD image, which can be obtained by interpolation methods, as the base layer, and estimates its detail layer from the input image, and thus obtains a well-estimated UHD image.

For example, let $I_k$ be the image at scale k. Scale is in reference to image resolution. Namely, $I_0$ is the input low-resolution (LR) image; $I_k$ with k<0 is the downsampled image of $I_0$ with factor $2^k$; and $I_k$ with k>0 is the upsampled image of $I_0$ with factor $2^k$. In certain embodiments, the CARTS apparatus computes an initial component, namely an initial guess, of the unknown $I_1$ with interpolation, denoted $\tilde{I}_1$, which is also regarded as the base layer of $I_1$. Then, the CARTS apparatus estimates the detail layer of $I_1$, denoted $\hat{X}_1$, from the detail layer of scale k=0, denoted $X_0$, and an approximation of the unknown detail layer of $I_1$, namely, $X_1$, denoted $\tilde{X}_1$. The CARTS apparatus obtains both of $X_0$ and $\tilde{X}_1$ from the input image $I_0$, which is the only known parameter in the single-image super-resolution problems. Once the $\hat{X}_1$ is obtained, the estimated UHD image can be obtained by adding $\hat{X}_1$ to the base layer $\tilde{I}_1$, as shown in Equation (1):

$$\hat{I}_1 = \tilde{I}_1 + \hat{X}_1 \qquad (1),$$

where $\hat{I}_1$ is the estimation of the real UHD image $I_1$.

The CARTS apparatus computes $\tilde{I}_1$ by interpolation, and estimates $\hat{X}_1$ via cross-scale high-frequency component self-learning. It is noted that $I_1$ is unknown, $X_1$ is also unknown, and its estimation $\hat{X}_1$ cannot be directly estimated. Assuming that an approximation of $X_1$, namely, $\tilde{X}_1$ can be computed from the known input image $I_0$, and the existence of a projection function $f(\cdot)$, which projects the HFC contaminated by the blur due to up-sampling to the blur-free HFC, or the HFC should be, and $\hat{X}_1 = f(\tilde{X}_1)$, the CARTS apparatus represents the unknown project function $f(\cdot)$ with Taylor expansion, and expands $f(\tilde{X}_1)$ at the approximation of the HFC of scale 0, namely, $\tilde{X}_0$, as shown in Equation (2), $$\hat{X}_1 = f(\tilde{X}_1) = f(\tilde{X}_0) + f'(\tilde{X}_0)(\tilde{X}_1 - \tilde{X}_0) + 0(\cdot), \qquad (2),$$

where $0(\cdot)$ is a high-order residual item, which usually can be omitted, and $\tilde{X}_1$ and $\tilde{X}_0$ can be directly computed from the input image. The only unknown item is the first-order derivative of $f(\cdot)$, namely, $f'(\cdot)$. The CARTS apparatus is configured to efficiently estimate $f'(\cdot)$.

FIG. 1 illustrates an example computing system 100 according to this disclosure. The embodiment of the computing system 100 shown in FIG. 1 is for illustration only. Other embodiments of the computing system 100 can be used without departing from the scope of this disclosure.

As shown in FIG. 1, the system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various client devices 106-116. Each server 104 includes any suitable computing or processing device that can provide computing services for one or more client devices. Each server 104 can, for example, include one or more processing devices, one or more memories storing instructions and data, and one or more network interfaces facilitating communication over the network 102.

Each client device 106-116 represents any suitable computing or processing device that interacts with at least one server or other computing device(s) over the network 102. In this example, the client devices 106-116 include a desktop computer 106, a mobile telephone or smartphone 108, a personal digital assistant (PDA) 110, a laptop computer 112, a tablet computer 114, and a UHDTV 116. However, any other or additional client devices can be used in the computing system 100.

In this example, some client devices 106-116 communicate indirectly with the network 102. For example, the client devices 108-110 communicate via one or more base stations 118, such as cellular base stations or eNodeBs. Also, the client devices 112-116 communicate via one or more wireless access points 120, such as IEEE 802.11 wireless access points. Note that these are for illustration only and that each client device can communicate directly with the network 102 or indirectly with the network 102 via any suitable intermediate device(s) or network(s). In certain embodiments, one or more client devices 106-116 can communicate with network 102 or server 104 via one or more satellite systems.

As described in more detail below, one or more of client devices 106-116 include a UHD display configured to display having a 16:9 ratio with at least one digital input cable carrying a minimum resolution of 3,840×2,160 pixels. The client devices 106-116 including the UHD display are configured to receive FHD or SD content from server 104 or another FHD content medium, such as content recorded on a disc or digital versatile disc (DVD), and display the FHD content as UHD content by content-adaptive real-time single-image super-resolution with adaptive-supported window based in-place self-learning.

Although FIG. 1 illustrates one example of a computing system 100, various changes may be made to FIG. 1. For example, the system 100 can include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features can be used in any other suitable system.

Figure 2:
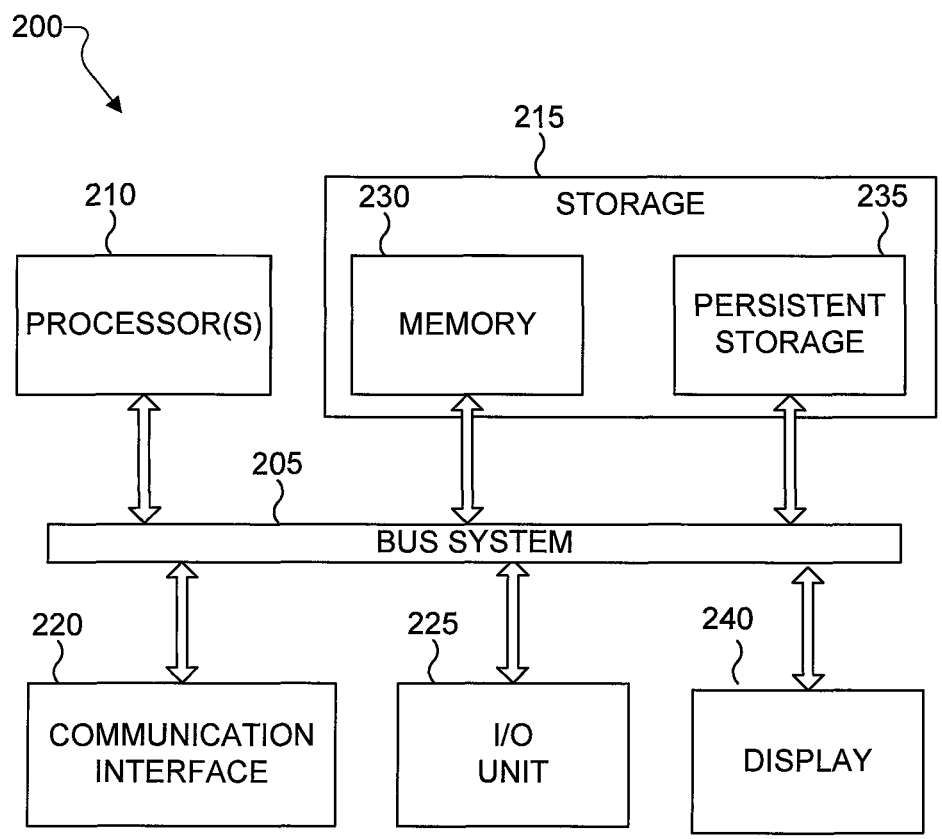
FIG. 2 illustrate a device having an Ultra-High Definition Display in a computing system according to an embodiment of this disclosure.
Figure 3A:
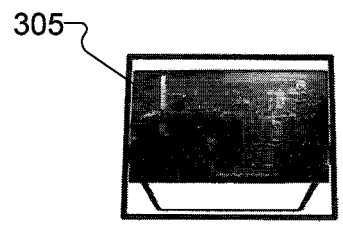
FIGS. 3A, 3B and 3C illustrate example Ultra-High Definition Displays according to embodiments of this disclosure.
Figure 3B:
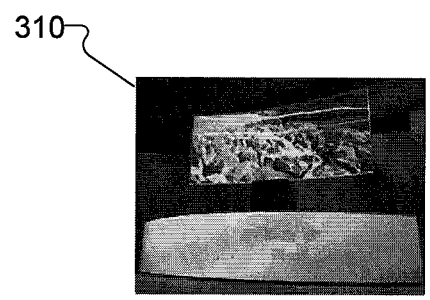
Figure 3C:
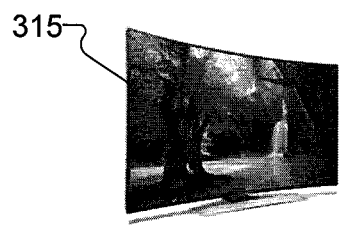

FIG. 2 illustrate a device having an Ultra-High Definition Display in a computing system according to this disclosure. FIGS. 3A, 3B and 3C illustrate example ultra-high definition displays according to this disclosure. The UHD device 200 can represent one or more of the client devices 106-116 in FIG. 1.

As shown in FIG. 2, the UHD device 200 includes a bus system 205, which supports communication between one or more processors 210, at least one storage device 215, at least one communications interface 220, and at least one input/output (I/O) unit 225. The storage device 215 can include a memory 230, a persistent storage 235, or both. The UHD device 200 also includes a UHD display 240.

The one or more processors 210 execute instructions that may be loaded into a memory 230. The one or more processors 210 include any suitable number(s) and type(s) of processors or other devices in any suitable arrangement. Example types of processors 210, or processing devices, include microprocessors, microcontrollers, digital signal processors, field programmable gate arrays, application specific integrated circuits, and discreet circuitry.

The memory 230 and persistent storage 235 are examples of storage devices 215, which represent any structure(s) capable of storing and facilitating retrieval of information (such as data, program code, and/or other suitable information on a temporary or permanent basis). The memory 230 can represent a random access memory or any other suitable volatile or non-volatile storage device(s). The persistent storage 235 can contain one or more components or devices supporting longer-term storage of data, such as a ready only memory, hard drive, Flash memory, or optical disc. The storage devices 215 can include instructions to be executed by a processor to perform fast single-image up-sampling with relative edge growth rate priors to convert FHD content to UHD content for display on the UHD display 240.

The communications interface 220 supports communications with other systems or devices. For example, the communications interface 220 can include a network interface card or a wireless transceiver facilitating communications over the network 102. The communications interface 220 can support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

The UHD display 240 includes a 16:9 ratio with at least one digital input cable carrying a minimum resolution of 3,840×2,160 pixels. Examples of the UHD display 240 can include a UHDTV such as a first UHDTV 305 shown in FIG. 3A, a second UHDTV 310 having a curved surface as shown in FIG. 3B, or a smaller display such as a third UHD display 315 shown in FIG. 3C. The UHD display 240 is configured to receive FHD content from server 104, from an external input via the I/O unit 225 or communication interface 220, or from another FHD content medium, such as content recorded on a disc or DVD, and display the FHD content as UHD content by content-adaptive real-time single-image super-resolution with adaptive-supported window based in-place self-learning. In certain embodiments, the one or more processors 210 are configured to perform content-adaptive real-time single-image super-resolution with adaptive-supported window based in-place self-learning to convert FHD content to UHD content for display on the UHD display 240. In certain embodiments, the UHD display 240 includes a processor or processing device configured to perform content-adaptive real-time single-image super-resolution with adaptive-supported window based in-place self-learning to convert FHD content to UHD content for display on the UHD display 240.

Note that while FIGS. 3A, 3B and 3C are described as representing UHDTVs 305, 310 and 315, the same or similar structure can be used in one or more of the client devices 106-116. For example, a laptop or desktop computer can have the same or similar structure as that shown in FIGS. 2, 3A, 3B and 3C.

Embodiments of the present disclosure provide a CARTS apparatus, system or method that does not require obtaining the correspondence between HFC and LFC with offline training.

In an offline training process, many real-world images containing different contents should be used to obtain non-bias and over-complete HFC-LFC correspondence dictionary pair. While performing online SR processing, the contents of an input FHD image are synthesized by the atoms of the HFC-LFC dictionary pair. The SR strategy of EBSR is not always reliable in practice, and can be very costly. First, due to the complexity of real-world image contents, it is difficult to set up a training set that contains all real-world contents; thus the dictionary cannot be guaranteed to be non-biased. Some contents may not be well synthesized by the dictionary atoms and, thus, lead to high-visual impacts in the up-sampled images. For example, our simulations have shown that in some edges along non-standard directions, such as directions along 0, 45, 90, 135, and 180 degree as standard directions, serious "jaggies" may occur after the edges being synthesized by the dictionary atoms. Second, sparse representation is used in many EBSR systems. The technique is iteration-based, and can be computational expensive, which can be difficult in hardware implementations. Third, since EBSR may synthesize image contents from dictionary atoms, the dictionary pair should be saved after training. To obtain relatively high visual quality, the number of dictionary atoms is usually high, such as 1024, which can be burdensome to hardware. Substantial system resources are required to store the dictionary pair.

In certain embodiments, the CARTS can provide SR without offline dictionaries by learning the HFC-LFC correspondence from input images themselves. In such a way, the CARTS gains three benefits. First, no dictionary pairs are required to store the HFC-LFC correspondence; that is, in the correspondence is determined from the input images. Therefore, system resources can be saved in hardware implementations and the cost of products can be decreased. Second, CARTS can avoid situations in which image contents cannot be well synthesized by any dictionary atoms. Since all HFC-LFC correspondences are learned from input images themselves, the up-sampled contents can be well synthesized for real-world contents. Third, training can be omitted in certain embodiments. This not only can decrease the cost of offline processing, which may involve massive iteration based optimization processing such as orthogonal match pursuit, but may also avoid regular product updating for maintaining the quality of the HFC-LFC dictionary pair.

Second, the CARTS disclosed in embodiments can omit iteration-based processing to learn the HFC-LFC correspondence. Instead, the CARTS adopts cross-scale matching strategy to obtain the HFC-LFC correspondence in certain embodiments. Therefore, it can be efficient. At the same time, the CARTS disclosed in embodiments of the present disclosure can achieve generally higher visual quality than can be achieved by a number of EBSR methods.

The CARTS disclosed in certain embodiments uses a single-image up-sampling algorithm. The CARTS estimates the HFC that are not recovered during up-sampling from the original input image. For example, image content has substantial redundancy in the same image or between different scales of the image. Certain embodiments learn the LF-HF correspondence from input images themselves in an online manner. Thus, CARTS image processing can omit a dictionary and can save system resources and greatly decreases the cost. Furthermore, the image processing algorithm synthesizes the up-sampled content from the input images.

Namely, CARTS image processing can effectively avoid the case that no dictionary atom can well synthesize some real-world image content.

Figure 4:
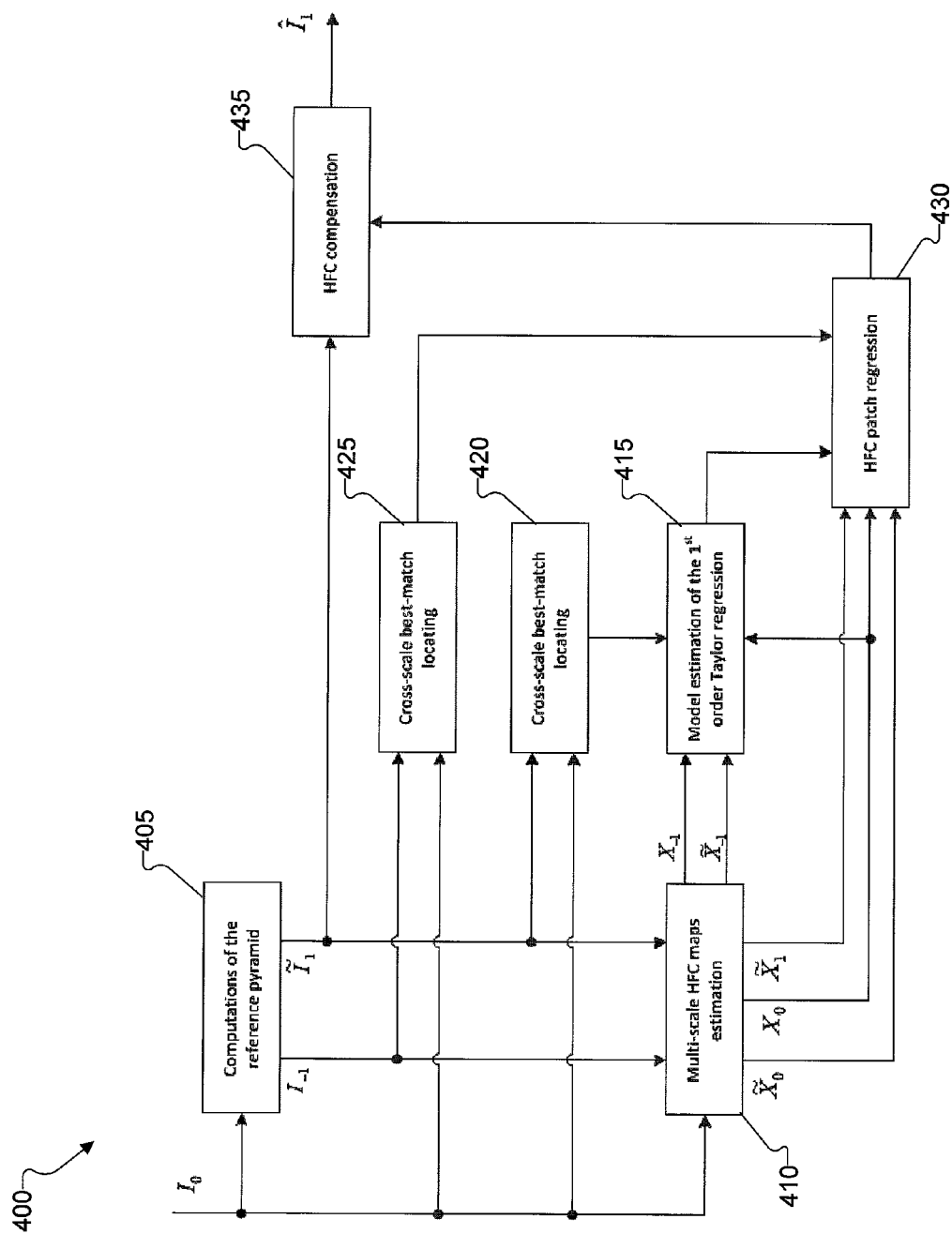
FIG. 4 illustrates a top level architecture of a content-adaptive real-time single-image super-resolution via cross-scale high-frequency component self-learning (CARTS) system according to an embodiment of the present disclosure.

FIG. 4 illustrates a top level architecture of a CARTS system according to an embodiment of the present disclosure. The embodiment of the CARTS system 400 shown in FIG. 4 is for illustration only. Other embodiments can be used without departing from the scope of the present disclosure.

An image can have abundant content redundancy in its different scales. Certain embodiments of the present disclosure adopt this important property to obtain high-quality up-sampled images by recovering the HFC that are not recovered in up-sampling from different image scales. For example, when $I_k$ is the image at scale k. Namely, $I_0$ is an input low-resolution (LR) image, $I_k$ with k<0 is the down-sampled image of $I_0$ with factor $2^k$, and $I_k$ with k>0 is the upsampled image of $I_0$ with factor $2^k$.

One or more of the client devices 106-116 include a CARTS system 400 that is able to convert image content from a first resolution, such as SD or FHD, for display on a UHD display device. For example, CARTS system 400 can be implemented by one or more processors in the respective client device 106-116. The CARTS system 400 receives an input image ($I_0$) and applies the input image to a reference pyramid computation block 405 and to a HFC map estimation block 410. The reference pyramid computation block 405 generates reference image pyramid including: 1) an initial component or base layer $\tilde{I}_1$, which is an initial estimate or guess of $I_1$, corresponding to a base layer of the output image; 2) a down-sampled image of $I_0$, namely $I_{-1}$; and 3) the input image $I_0$, which is known and, as such, not necessary to compute. As shown in Equation (1), the UHD counterpart is regarded as consisting of two parts, namely, a base layer, and a detail layer.

The CARTS system 400 estimates the HFC of $I_1$, namely, $\hat{X}_1$ by cross-scale in-place learning. The reference image pyramid computed from the reference pyramid computation block 405 is output to the HFC map estimation block 410, which computes the HFC of the input image $I_0$, namely, $X_0$, as well as the approximation of $X_0$, namely, $\tilde{X}_0$; the HFC of the image at scale −1, that is, $X_{-1}$, as well as its approximation $\tilde{X}_{-1}$, and the approximation of the unknown HFC $\hat{X}_1$, namely, $\tilde{X}_1$. As shown in Equation (2), the project function $f(\bullet)$ projects a blur contaminated HFC to a blur-free HFC, or the HFC that should be, namely, $f(\tilde{X}_0)=X_0$. By omitting the high-order residual item, from Equation (2), the unknown $\hat{X}_1$ can be estimated according Equation (3):

$$\hat{X}_1 \approx X_0 + f'(\tilde{X}_0)(\tilde{X}_1 - \tilde{X}_0), \qquad (3),$$

where the only unknown item is the first-order derivative $f'(\bullet)$. A regression model estimation block 415 of the first-order Taylor expansion estimates $f'(\bullet)$ by adopting the property of real-world image content redundancy. It is noted that each of $X_0$, $\tilde{X}_0$, and $\tilde{X}_{-1}$ are known, and due to the content redundancy between scale 1 and scale 0, a cross-scale in-place learning block 420 determines the best matched patch pair between scale 1 and scale 0 by cross-scale matching. Since the best-matched patches have similar contents, they have similar HFC. Namely, to any patch of $\tilde{X}_1$ in scale 1, a best-matched patch can be determined in $X_0$, which is located in scale 0. Also, with the cross-scale best matching, the cross-scale in-place learning block 425 determines the best-matched patch pairs between $X_0$ and $X_{-1}$, which are the details (HFC) of scale 0 and scale −1. As used herein, the term "best-matched" refers to using a matching criterion and does not necessarily refer to a global matching condition. As used herein, the terms "best matched" and "well matched" can be used interchangeably. Due to the huge content redundancy between different image scales, the best-matched patches in $\hat{X}_1$, $X_0$, and $X_{-1}$ are high probable to have similar HFC. The regression model estimation block 415 estimates the coefficients of $f'(\bullet)$ from the HFC and their approximation in scales 0 and 1. With Equation (3), $X_0$ can be expressed with $\tilde{X}_0$ and $X_{-1}$, as shown in Equation (4A):

$$X_0 \approx X_{-1} + f'(\tilde{X}_{-1})(\tilde{X}_0 - \tilde{X}_{-1}). \tag{4A}$$

As apparent in Equation (4A), $X_0$, $X_1$, $\tilde{X}_0$, and $\tilde{X}_{-1}$ can be determined, thus $f'(\bullet)$ can be computed from Equation (4A) as shown in Equation (4B).

$$f'(\tilde{X}_{-1}) \approx \frac{X_0 - X_{-1}}{\tilde{X}_0 - \tilde{X}_{-1}}. \tag{4B}$$

Due to the similarity between the patches in different scales, the $f'(\bullet)$ estimated between scale 0 and -1 has high probability that is similar to the $f'(\bullet)$ between scale 0 and 1, as shown in Equation (4C).

$$f'(\tilde{X}_0) \approx f'(\tilde{X}_{-1}), \tag{4C}$$

and can be adopted by Equation (3). Knowing all items in Equation (3), an HFC patch regression block 430 estimates $\hat{X}_1$ with Taylor regression. Thereafter, the HFC compensation block 435 compensates the estimated HFC $\hat{X}_1$ to the base layer $\tilde{I}_1$, and obtains the estimation of the UHD image $\hat{I}_1$. In practice, it may not be convenient to recover the lost HFC in image-wise manner. Instead, the lost HFC can be recovered in patch-wise manner. Also, directly adopting Equation (3) in practice to approximate the lost HFC may lead to small distortions in delicate structures. This is caused by the complexity of image contents. Letting $B_*(\bullet)$ be an image patch located at position ($\bullet$) in scale $*$, and $P_*(\bullet)$ be an HFC patch located at position ($\bullet$) in scale $*$ from Equation (3), patch $\hat{P}_1(x^1)$ can be estimated in scale 1 from its approximation $\tilde{P}_1(x^1)$, and the patch $P_0(x^0)$ as well as its approximation $\tilde{P}_0(x^0)$, which can be estimated in scale 0. Although illustrated with reference to "blocks", each of the blocks can represent individual processing devices, such as respective processors or processing circuitry, or instruction sets, such as stored in storage 215, for execution by one or more processors, such as processor(s) 210.

Regarding the cross-scale in-place learning block 420 and 425, the best-matched patches can be located by a number of strategies. For example, the patches can be located as the patch pairs that lead to the minimum sum of absolute difference, as shown in Equation (4D)

$$B_0(x_t^0) = \operatorname{argmin}_{\forall x_m^0 \in \mathcal{R}^0} \Sigma_{x_m^0} |\tilde{B}_1(x^1) - B_0(x_m^0)|, \tag{4D}$$

where $x_t^0$ is the position of the best matched patch in scale 0 of an image patch located at $x^1$ in scale 1, $x_m^0$ is the position of a candidate (the m-th) patch in scale 0, and $R^0$ is the searching range. It is noted that $\tilde{B}_1(\bullet)$ is a patch in $\tilde{I}_1$. As shown in Equation (4D), each point in an image patch contributes equally to the matching result. Another way, which may provide content-robustness, is to obtain the cross-scale matching patch pairs is to make the points that are similar to each other contribute more to the matching result than other points, as shown in Equation (4E):

$$B_0(x_t^0) = \operatorname{argmin}_{\forall x_m^0 \in \mathcal{R}^0} \Sigma_{x_m^0} w |\tilde{B}_1(x^1) - B_0(x_m^0)|, \tag{4E}$$

where w is the weights computed from a Gaussian kernel. The higher the similarity between two corresponding pixels is, the higher the weight is. With Equations (4D) or (4E), the best matched cross-scale contents are determined, thus the cross-scale corresponding HFC contents are determined.

The HFC compensation block 435 compensates the estimated $\hat{X}_1$ to $\tilde{I}_1$ to generate a visually appealing estimation of $\hat{I}_1$. The HFC compensation block 435 directly adds the estimated $\hat{X}_1$ to $I_1$, as shown in Equation (1). However, due to the complexity of image contents, not all points in a pair of well-matched patch are required to match well. At the corresponding positions of the points that are not well-matched between scale 1 and scale 0, small distortions may occur due to the matching errors. In strong edge areas or flat areas, the errors are usually small, and do not affect the final visual quality. In delicate texture areas, the errors may lead to relatively high visual impacts. Therefore, in certain embodiments of the present disclosure, content-adaptive HFC regression is deployed in HFC patch regression block 430 to adaptively compute the HFC according to the contents of the best-matched patches. In one example, the first N best-matched HFC patches of a given $\tilde{P}_1(x^1)$ in scale 0 are found, and the estimated HFC is the average of the HFC computed from different patch pairs. From Equation (3), Equation (4F) can be obtained as follows:

$$\hat{P}_1(x^1) \approx \frac{1}{N} \sum_N (p_0(x^0) + f'(\tilde{p}_0(x^0))(\tilde{p}_1(x^1) - \tilde{p}_0(x^0)). \tag{4F}$$

Another example way to estimate $\hat{P}_1(x^1)$ is to estimate its contents considering the similarity between the corresponding pixels of a best-matched image pair. The HFC corresponding to the similar pixels contributes more in HFC compensation than the pixels that are not similar enough. A range filter kernel is used to generate a coefficient patch, where the well-matched point pairs are assigned by bigger weights, as shown in Equation (4G):

$$\alpha = a \times \exp\left(-\frac{(B_0(x_t^0) - \tilde{B}_1(x^1))^2}{\sigma_R^2}\right), \tag{4G}$$

where a is a sharpness control gain factor that controls that how sharp an image structure will be appeared in the output images, and $\sigma_R^2$ is the standard deviation of the range filter kernel. The higher the value of a is, the sharper image structures will appear in the up-sampled images. It is noted that it is not always true that the higher a is, the better the final visual quality will be. The value of a can be a trade-off between sharpness and naturalness. If a is too high, the upsampled structures may lose naturalness and look like cutting effects.

With Equation (4G), the content-adaptive Taylor expansion is defined according to Equation (4H):

$$\hat{P}_1(x_t^1) \approx \gamma[\alpha P_0(x_t^0) + f'(\tilde{P}_0(x_t^0))(\tilde{P}_1(x_t^1) - \tilde{P}_0(x_t^0))], \tag{4H}$$

where t is the index of a pixel in a patch; and $\gamma$ is a global control gain that controls how many HFC will be compensated back to the up-sampled image patch. The factor can be set depending upon viewing parameters. If sharper and crystal clear effects are desired, and some sacrifices of naturalness can be tolerated, the parameters can set $\gamma > 1.0$. When natural contents are desired and slight blur is acceptable, the parameters can set $\gamma < 1.0$. In certain embodiments of the present disclosure, the global control gain is set where $\gamma = 1.0$.

To further maintain the continuity of image contents, overlapped patches in the processing can be adopted. By adopting the overlapped patches, the HFC of the current patch can be accumulated from the HFC of the neighboring patches, and the averaging HFC is computed as the $\hat{P}_1(x^1)$.

Figure 5:
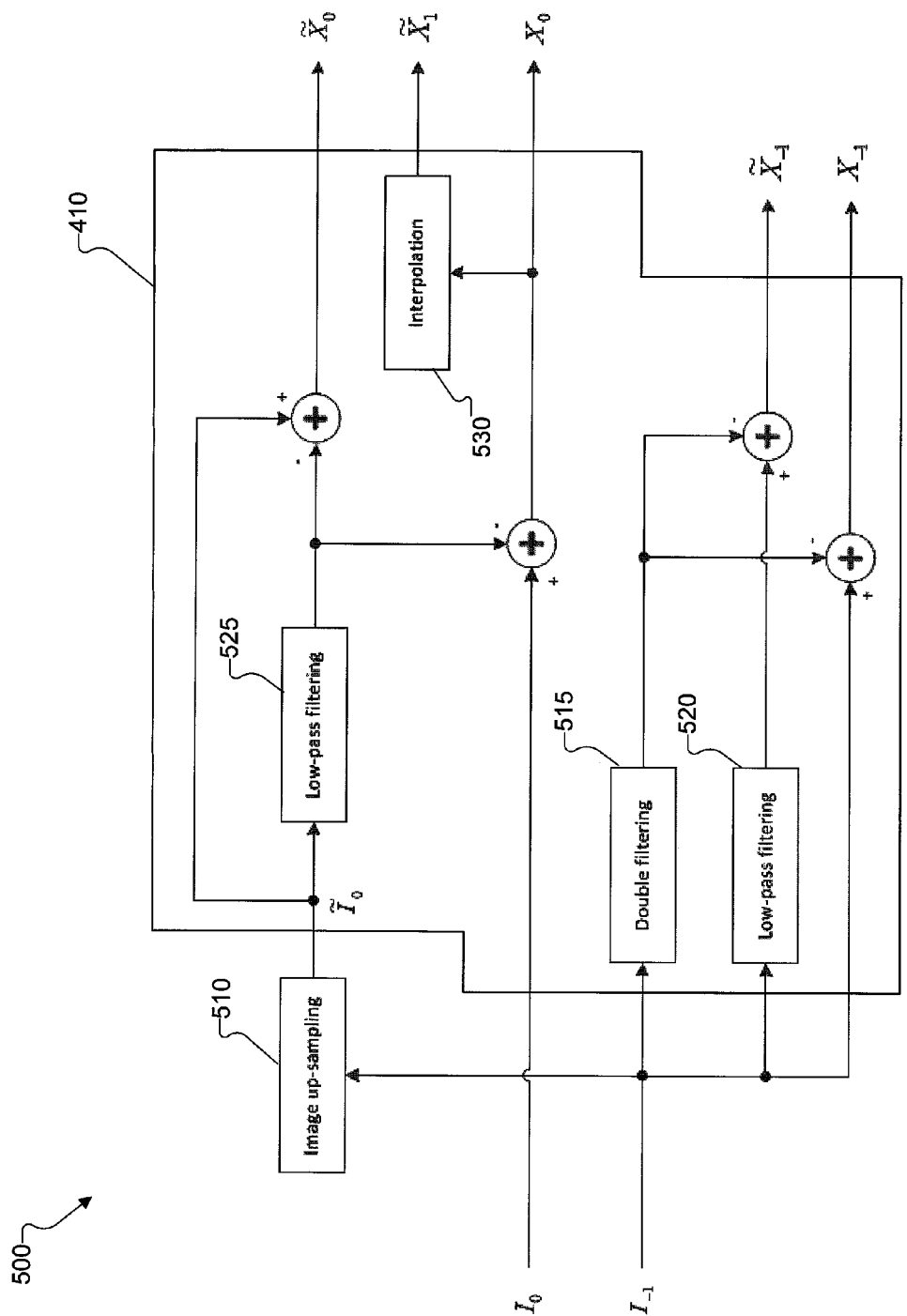
FIG. 5 illustrates an architecture for generating high frequency components (HFC) in different image scales for cross scales matching according to an embodiment of the present disclosure.

FIG. 5 illustrates an architecture for generating HFC in different image scales for cross scales matching according to an embodiment of the present disclosure. The embodiment of the architecture 500 for generating cross scales HFC shown in FIG. 5 is for illustration only. Other embodiments can be used without departing from the scope of the present disclosure.

In certain embodiments, the HFC map estimation block 410 computes the HFC in different image scales as well as their approximations. The down-sampled image $I_{-1}$ in the reference image pyramid computed reference pyramid computation block 405 is provided to an image up-sampling block 510. The down-sampled image $I_{-1}$ is parallel processed through double-filtering block 515 and low-pass filtering block 520. The outputs of the double-filtering block 515 and low-pass filtering block 520 are combined to generate $\tilde{X}_{-1}$. The output of the double-filtering block 515 also is combined with the input image ($I_0$) to generate $X_{-1}$. The up-sampled $I_{-1}$, regarded as an estimation of $I_0$, denoted $\tilde{I}_0$ is processed by a low-pass filter 525, the output of which is combined with $\tilde{I}_0$ to generate $\hat{X}_0$. The output of the low-pass filter 525 also is combined with the input image $I_0$ to generate $X_0$, which is also processed by interpolation block 530 to generate $\tilde{X}_1$.

In certain embodiments, with the CARTS system 400 and the CARTS architecture 500, a well-estimated UHD image can be computed. Alternatively, the HFC of different image scales and the first-order derivative coefficients $f'(\bullet)$ can be computed more efficiently for pursuing higher efficiency and cheaper cost when minor visual impacts are acceptable, such as when the UHD image is displayed on high-resolution but small size screen such as a smart phone or tablet, for example.

In certain embodiments, the HFC in scale 1 and 0 can be directly computed from economic and efficient low-pass filtering instead of reference image pyramid. If a pair of appropriate parameters s and $\sigma_b$ that can make $LP(s,\sigma_b)[I_1] \approx \tilde{I}_1$ can be found, Equation (1) can be rewritten as Equation (5):

$$I_1 = \tilde{I}_1 + \Delta_1 + X_1(s,\sigma_b), \quad (5)$$

where $\Delta_1$ is the residuals between $LP(s,\sigma_b)[I_1]$ and $\tilde{I}_1$. If $\Delta_1$ is small enough, an estimation of $I_1$ can be obtained as Equation (6):

$$\hat{I}_1 = \tilde{I}_1 + \hat{X}_1, \quad (6)$$

which is with the same form as Equation (1) but with employing different computation strategies. From Equation (6), it can be seen that if $\Delta_1$ is small enough, a good estimation of $I_1$ can be obtained from an initial guess of $I_1$ (obtained by interpolation) and the detail layer containing the HFC that are lost because of the low-pass filtering with appropriate parameters s and $\sigma_b$.

Obtaining $\tilde{I}_1$ can be computed by any interpolation methods. For example, considering the performance and efficiency issues, Bicubic or bilinear interpolation can be used. Both of the interpolation methods are efficient, and can provide later processing with good quality initial estimate. However, it may not be easy to compute $\hat{X}_1$ since $I_1$ is unknown. Certain embodiments of the present disclosure estimate $\hat{X}_1$ from the details of $I_0$ and with the same low-pass filtering processing.

First, parameters are determined for the low-pass filter that is used to obtain the image details. To determine the parameters, many UHD images are randomly downloaded as the ground truth images $\{I_1\}$. Many real-world UHD images are randomly selected as ground truth images, namely, associated reference images. Down-sampled counterparts $\{I_0\}$ are then obtained by an image scaler, such as an interpolation based scaler. To each pair of $I_1$ and $I_0$, the low-pass filter $LP(s,\sigma_b)$ is found by find the s and $\sigma_b$ that satisfy Equation (7):

$$\text{argmax}_{\forall s,\sigma_b} PSNR(LP(s,\sigma_b)[I_1], \uparrow_2[I_0]), \quad (7),$$

where $PSNR(\bullet)$ is the function that computes the peak-signal-noise-ratio (PSNR) between an image and its reference image. Simulations show that with s=3, and $\sigma_b \approx 1.0$, the PSNR achieves the maximum, and it is averagely over 40 dB (the maximum PSNR we achieved is over 42 dB). Such a high PSNR indicates that $\Delta_1$ can be regarded as small enough. Once s and $\sigma_b$ are determined, the details of $I_0$, denoted $X_0$, is computed as:

$$X_0 = I_0 - LP(s,\sigma_b)[I_0]. \quad (8).$$

An example way to estimate $\hat{X}_1$ is to apply an up-sampling algorithm, such as interpolation to $X_0$. Simulations show that this is a good solution to obtain high-quality up-sampled images. Since HFC can exist in $X_0$, directly up-sampling can lose quite a few of the HFC in the up-sampled details. Therefore, up-sampling $X_0$ can only obtain an approximation of $\hat{X}_1$, denoted $\tilde{X}_1$, as shown in Equation (9):

$$\tilde{X}_1 = \uparrow_2[X_0]. \quad (9).$$

With the same low-pass filter, the approximation of $X_0$, namely $\tilde{X}_0$ can also be computed as $$\tilde{X}_0 \approx \uparrow_2[I_{-1} - LP(s,\sigma_b)[I_{-1}]]. \quad (10).$$

Knowing $X_0$, $\tilde{X}_0$, and $\tilde{X}_1$, from Equation (3), the only unknown item is $f'(\tilde{X}_0)$.

From Equation (2) and Equation (3), once the first-order derivative $f'(\bullet)$ is determined, the HFC $\hat{X}_1$ can be estimated. In addition to the processes disclosed in FIG. 4 and FIG. 5, $f'(\bullet)$ can be imprecisely approximated from some of its properties. As indicated above, one of the most important properties of $f(\bullet)$ is that $f(\bullet)$ can project the blur contaminated details into blur-free details. To analyze the property, we generate a strong edge. Then, two different low-pass filters are applied to the edge; thus two filtered edges can be obtained. One looks blurrier, and the other looks sharper. The HFC that are lost in the two filtered edges are shown in FIG. 6

Figure 6:
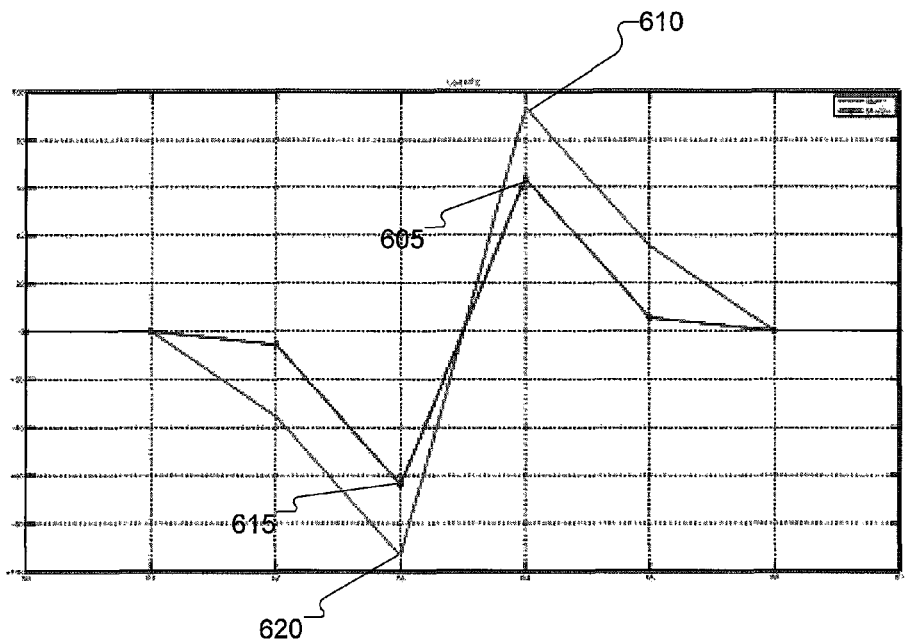
FIG. 6 illustrates an example of the lost HFC caused by different low-passing filtering of the same edge according to an embodiment of the present disclosure.

FIG. 6 illustrates an example of the lost HFC caused by different low-passing filtering of the same edge according to an embodiment of the present disclosure. The example of the lost HFC 600 shown in FIG. 6 is for illustration only. Other examples can be used without departing from the scope of the present disclosure.

As can be seen from FIG. 6, at the boundary of an edge, the low-pass filters decrease the higher intensities, and increase the lower intensities. The behavior of $f(\bullet)$ can be regarded as an inverse processing of low-pass filtering. The projection function $f(\bullet)$ makes the higher values 605 in HFC even higher 610, and makes the lower values 615 in HFC even lower 620. Let $\vec{v}$ be a general vector, and $\Delta v$ is a small change of $\vec{v}$, Equation (11):

$$\begin{cases} f(\tilde{v}+\Delta v) \geq f(\tilde{v}): \Delta v \geq 0 \\ f(\tilde{v}+\Delta v) < f(\tilde{v}): \text{others} \end{cases} \quad (11)$$

From the definition of the first derivative of a function, $f'(\tilde{v})$ is rewritten as shown in Equation (12):

$$f'(\tilde{v}) = \lim_{\Delta x \to 0} \frac{f(\tilde{v}+\Delta v) - f(\tilde{v})}{\Delta v}. \quad (12)$$

Based on Equation (11) and Equation (12), it is apparent that $f'(\bullet)$ is non-negative in a small region of an edge point, and:

1) For the case that $f(\tilde{v}+\Delta v)-f(\tilde{v})$ is a higher-ord item of $\Delta v$, the limit is infinity. From (9), we can know that this is impossible for real-world images.

2) For the case that $f(\tilde{v}+\Delta v)-f(\tilde{v})$ is a lower-order item of $\Delta v$, the limit is zero.

3) For the case that $f(\tilde{v}+\Delta v)-f(\tilde{v})$ and $\Delta v$ have the same order, the limit is a constant vector.

Another constraint that can be used to approximate $f'(\bullet)$ is the continuity of real-world contents. Due to the content continuity, there are few high-visual impacts existing in real-world images. From Equation (3), this observation indicates that $f'(\bullet)$ should not be very big. Otherwise, $(\tilde{X}_1 - \tilde{X}_0)$ may lead to serious intensity changes into the up-sampled contents, and thus generate high-visual impacts.

The CARTS can approximate $f'(\bullet)$ in a number of ways. For example, one example way was described above in connection with Equations (4B) and (4C). Other alternative ways can be used. One example is described below in greater detail.

In certain embodiments of the present disclosure, the CARTS approximates $f'(\bullet)$ as a small and non-negative coefficient vector. Also, based on the observations that the shaper an edge is, the more HFC it may lose after low-pass filtering, the CARTS approximates $f'(\bullet)$ adaptively to the sharpness of edges. Considering the dependence between sharpness and edge gradients, the CARTS approximates $f'(\bullet)$ with gradients, denoted g, and a mapping function $T(\bullet)$. Note that $T(\bullet)$ can be either linear or non-linear. Non-linear mapping g to $f'(\bullet)$ can be more accurate than the linear mapping. However, nonlinear processing is computationally expensive, and has difficulties to be economically defined. In certain embodiments of the present disclosure, a linear mapping function is adopted to approximate $f'(\bullet)$, as shown in Equation (13):

$$f'(\tilde{X}_0) \approx \begin{cases} a_l: g < t_l \\ a_l + \frac{a_h - a_l}{t_h - t_l}: t_l \leq g \leq t_h \\ a_h: g > t_h \end{cases} \quad (13)$$

where $t_l$ and $t_h$ are a low and a high threshold values of gradients, respectively; and $a_l$ and $a_h$ are the lowest and highest possible coefficients of $f'(\bullet)$. In practice, $a_l$ and $a_h$ can be set according to the user desired enhancement degree.

Figure 7:
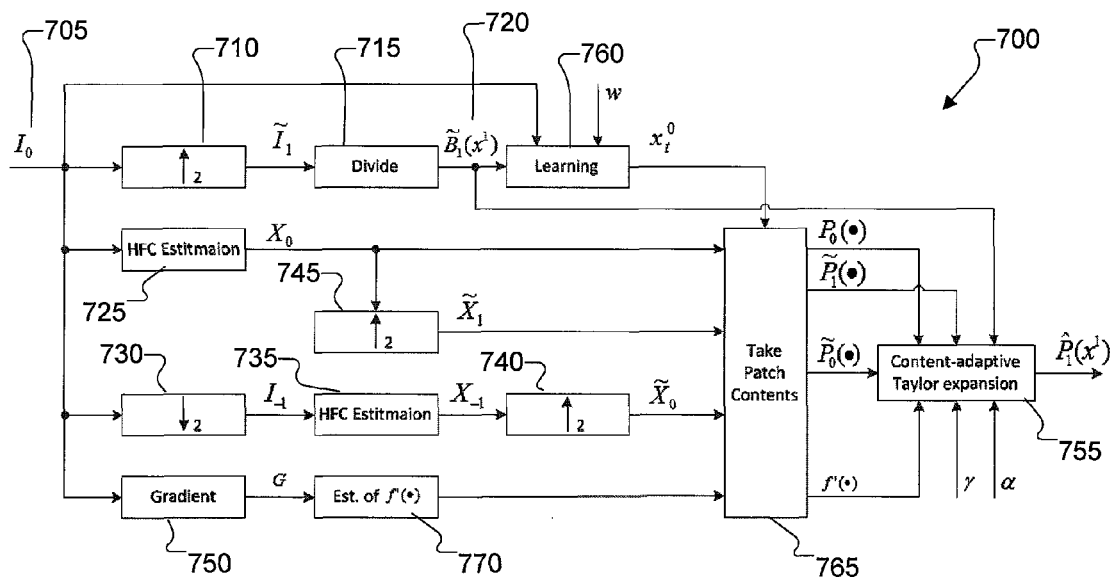
FIG. 7 illustrates an example CARTS system for another content-adaptive real-time single-image super-resolution with adaptive supported in-place self-learning according to an embodiment of the present disclosure.

FIG. 7 shows the flow diagram of this processing.

FIG. 7 illustrates an example CARTS system for content-adaptive real-time single-image super-resolution according to an embodiment of the present disclosure. The embodiment of the CARTS system 700 shown in FIG. 7 is for illustration only. The CARTS system 700 can be the same as CARTS system 400 or configured differently from CARTS 400. For example, "Learning" and "Taylor expansion" in CARTS system 700 can be the same as the corresponding blocks in CARTS system 400. The other blocks in CARTS system 700 are for HFC computation, including 1) computing the HFC maps, such as $\tilde{X}_0$, $\tilde{X}_1$, and so forth, and 2) estimating $f(\bullet)$. Both of the parts are related to HFC computation. That is, in certain embodiments, learning and Taylor regression of the CARTS system 700 can be similar to learning and Taylor regression described in connection with the CARTS system 400. However, the computation of the HFC maps such $\tilde{X}_0$, $\tilde{X}_1$, and so forth, and $f'(\bullet)$, may be different between the CARTS system 700 and the CARTS system 400. Other embodiments can be used without departing from the scope of the present disclosure.

As shown in FIG. 7, an FHD image $I_0$ 705 is received to be processed by the CARTS system 700. To a given FHD image $I_0$, an initial guess of its UHD image is computed by interpolation based up-sampling 710, such as by a factor of 2, to generate $\tilde{I}_1$. Then, $\tilde{I}_1$ is divided 715 into many equal-size and overlapped image patches 720, denoted $\{\tilde{B}_1(x^1)\}$, where $x^1$ is the center of an image patch 720. An HFC estimate 725 is performed in which the details containing the HFC that are lost because of the low-pass filtering, namely, $X_0$, is computed from $I_0$ by Equation (8). An approximation of $X_0$, namely, $\tilde{X}_0$ is then computed, such as by down-sampling 730 with a factor of 2, performing an HFC estimate 735 and up-sampling 740 with a factor of 2. At the same time, the approximation of $X_1$, namely, $\tilde{X}_1$ is computed 745 by Equation (9). In addition to the approximations of the details of different scales, in gradient block 750 image gradient map G is also computed for later first-derivative approximation. In the first two steps, the necessary data maps are computed for later Taylor expansion based content synthesis 755.

The third, an efficient self-learning processing 760, defined in Equation (4E) is applied to each patch 720 $\tilde{B}_1(x^1)$. According to the best-matched cross-scale patches found by 720, the cross-scale corresponding HFC patches $P_0(\bullet)$, $\tilde{P}_0(\bullet)$, and $\tilde{P}_1(\bullet)$ are determined. The fourth, content-adaptive Taylor expansion, as defined in Equation (4F) or averaging overlapped HFC strategy introduced in the previous paragraph, is adopted to estimate the lost HFC of $\tilde{B}_1(x^1)$, namely $\hat{P}_1(x^1)$. In the example shown in FIG. 7, the coefficients of $f'(\bullet)$ are approximated by Equation (13) in estimation block 770. In certain embodiments, the content-adaptive Taylor regression can also be used in the solutions shown in FIG. 4 and FIG. 5.

In certain embodiments, one function of the content-adaptive Taylor expansion 755 is to make the point pairs that are well-matched to each other contribute more in Taylor expansion than the point pairs that do not match well.

Figure 8A:
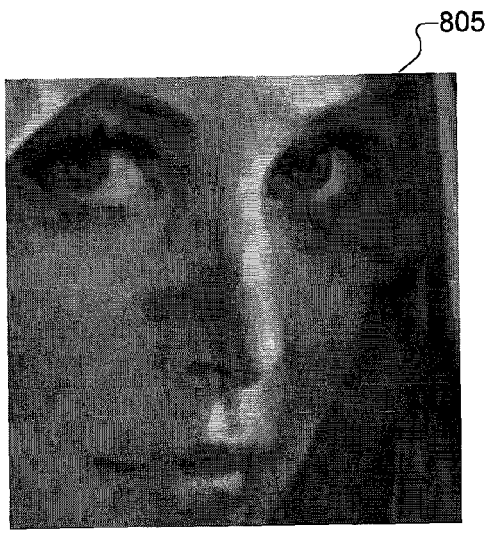
FIGS. 8A, 8B, 8C and 8D illustrate a comparison of an up-sampled test image according to an embodiment of the present disclosure.
Figure 8B:
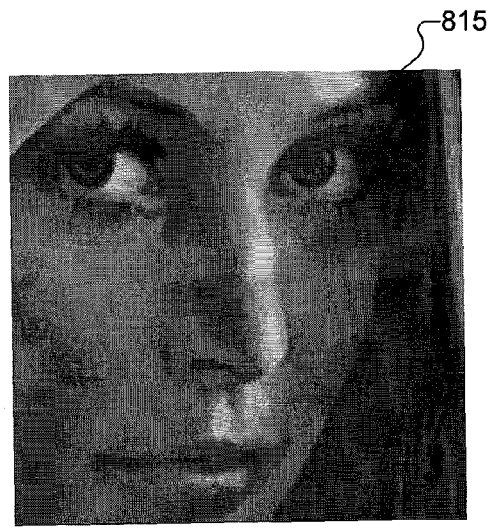
Figure 8C:
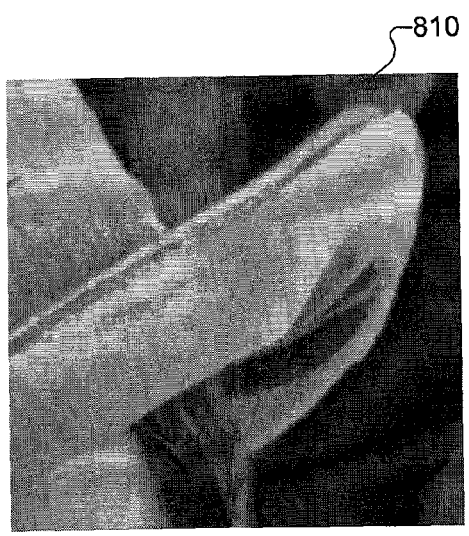
Figure 8D:
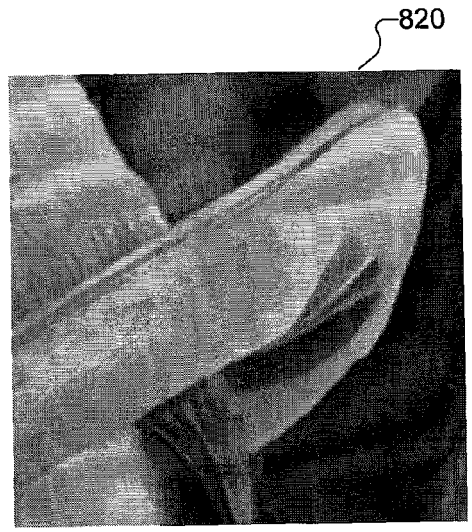

FIGS. 8A, 8B, 8C and 8D illustrate a comparison of an up-sampled test image according to an embodiment of the present disclosure. The comparisons shown in FIGS. 8A through 8D are for illustration only and other examples can be used without departing from the scope of this disclosure. A first test image "Lenna" 805 illustrated in FIG. 8A and a second test image "Lenna" 810 illustrated in FIG. 8C are converted using an example scaling algorithm. The first test image "Lenna" 815 illustrated in FIG. 8B and the second test image "Lenna" 820 illustrated in FIG. 8D are converted using a CARTS system. Although three up-sampling algorithms are used for comparison, any number of algorithms can be used and any known algorithm can also be utilized for comparison.

To evaluate the performance of embodiments of the present disclosure, the CARTS and an example scaling algorithm, were applied to many real-world video sequences and high-quality static images. The visual quality of the up-sampled images obtained by the CARTS and the scaling algorithm were compared. In total, twenty video sequences in a test video database and over seventy static images containing different image contents are used in these simulations. In the interest of brevity, only some of the example results are illustrated.

As shown in the examples illustrated in FIGS. 8A through 8D, embodiments of the present disclosure recover many image details as compared to the results of the scaling algorithm. The CARTS successfully sharpens the strong edges, boosts delicate textures, but at the same time, protects the natural blur and maintains the naturalness of strong edges. Although it may appear that the CARTS slightly boosts the existing noise, this existing noise actually belongs to HFC as well. Its high sensitivity to HFC will bring abundant image details when being applied to high-quality images.

Figure 9A:
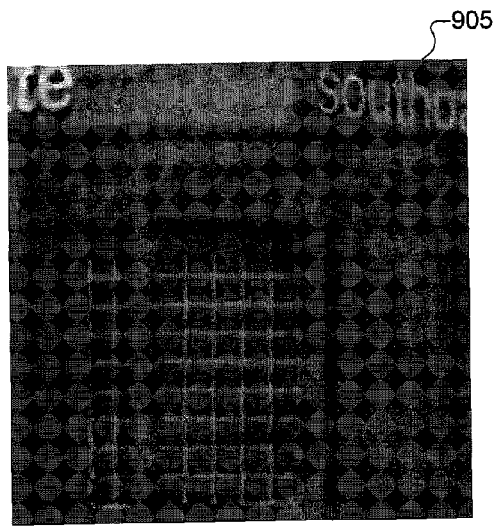
FIGS. 9A, 9B, 9C and 9D illustrate up-sampled images of test image "City River" according to an embodiment of the present disclosure.
Figure 9B:
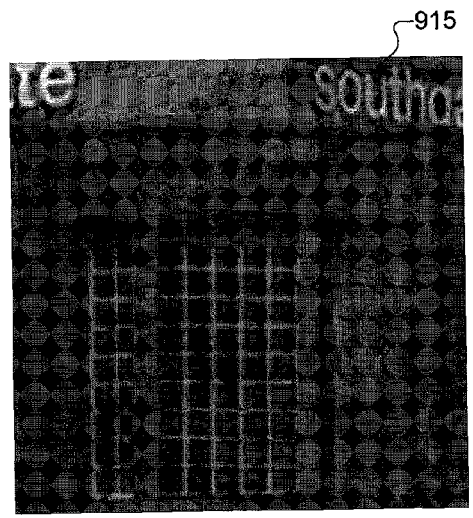
Figure 9C:
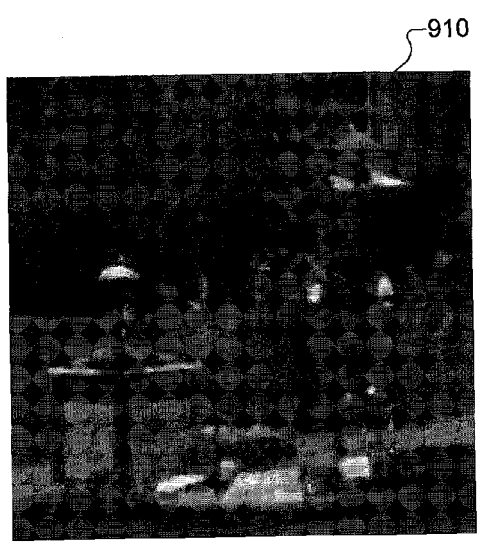
Figure 9D:
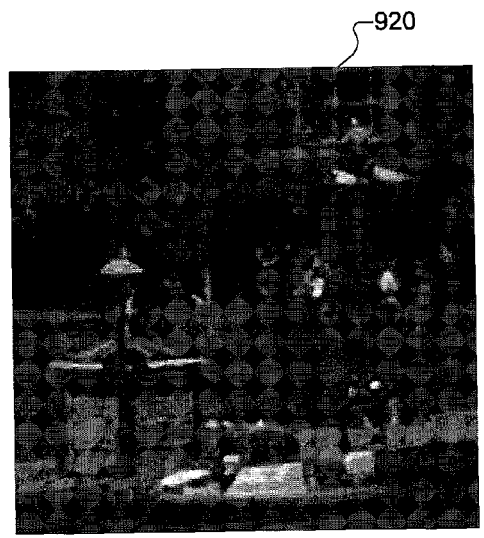

FIGS. 9A, 9B, 9C and 9D illustrate up-sampled images of test image "City River" according to an embodiment of the present disclosure. The comparisons shown in FIGS. 9A through 9D are for illustration only and other examples can be used without departing from the scope of this disclosure. A first test image "City River" 905 illustrated in FIG. 9A and a second test image "City River" 910 illustrated in FIG. 9C are converted using an example scaling algorithm. The first test image "City River" 915 illustrated in FIG. 9B and the second test image "City River" 920 illustrated in FIG. 9D are converted using a CARTS system. Although three up-sampling algorithms are used for comparison, any number of algorithms can be used and any known algorithm can also be utilized for comparison.

In the examples shown in FIGS. 9A through 9D, the test image "City River" is a FHD image with relatively high visual quality. As shown in the first test image "City River" 905 and the second test image "City River" 915, the results from the scaling algorithm are quite blurry. The HFC lost during up-sampling are not effectively recovered. The results of the CARTS on the second test image "City River" 910 and the second test image "City River" 920 look much sharper and clearer. Strong edges are reasonably sharpened, and abundant image details are recovered. Also, all natural blur contents are well reserved. Comparing to the results obtained by the scaling algorithm, when being displayed in an UHD TV, the up-sampled images obtained by the CARTS brings audiences with sharp, clear, and natural contents.

In addition to the high performance of SR, the CARTS is also very efficient. Simulations show that the CARTS can have similar efficiency as that of an efficient scaling algorithm depending on its parameters. In certain simulations, it is noted that if the searching range used in the in-place self-learning is set to 1, embodiments of the CARTS can have very similar or slightly higher efficiency than the scaling algorithm, but the obtained up-sampled images have much higher visual quality than scaling algorithm. To further improve the visual quality of the up-sampled images, the searching range can be set to $\mathcal{R} > 1$. In certain examples, after testing different searching ranges, it is noted that $\mathcal{R} = 2$ is a good trade-off between efficiency and image quality. With this range, the efficiency of certain embodiments of the CARTS is about 35% lower than the scaling algorithm, but this is not a big issue since the scaling algorithm itself is very efficient, but the obtained image quality can be significantly improved. Comparing to an EBSR algorithm, it was found that the CARTS is about twelve times faster than the tested EBSR, and at the same time, certain embodiments of the CARTS obtain more visually pleasing up-sampled images than tested SR algorithms.

Figures 10A, 10B:
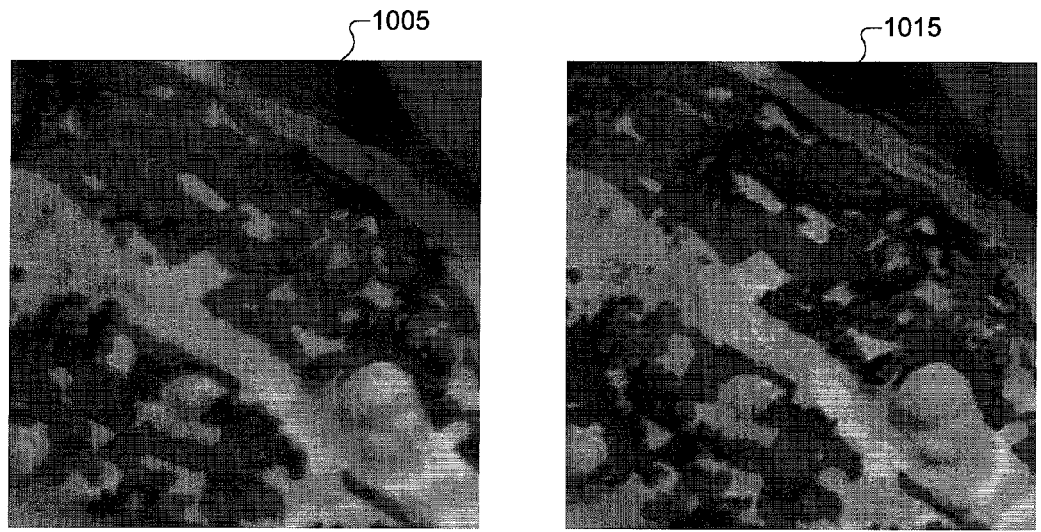
FIGS. 10A and 10B illustrate examples of the visual quality of the up-sampled delicate textures obtained by an example Timofte SR algorithm and the CARTS according to an embodiment of the present disclosure.

FIGS. 10A and 10B illustrate shows an example of the visual quality of the up-sampled delicate textures obtained by an example SR algorithm and the CARTS according to an embodiment of the present disclosure. FIG. 10A illustrates a first image 1005 processed through up-scaling utilized by the example SR algorithm. FIG. 10B illustrates the first image 1010 processed through up-scaling utilizing the CARTS according to an embodiment of the present disclosure. Although three up-sampling algorithms are used for comparison, any number of algorithms can be used and any known algorithm can also be utilized for comparison. As can be seen in the first image 1010, the CARTS recovers many image details, and at the same time obtains sharp but natural strong edges.

Figure 11:
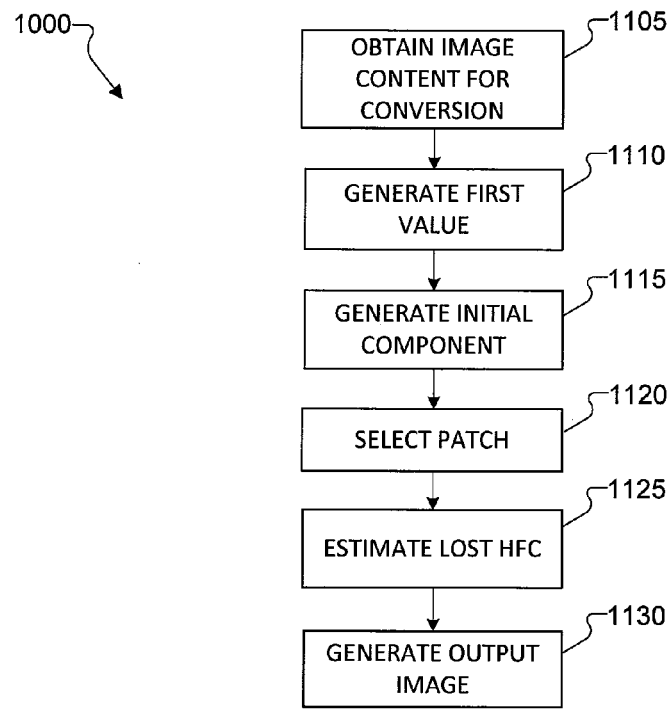
FIG. 11 illustrates a flow chart of a method for converting image content according to an embodiment of the present disclosure.

FIG. 11 illustrates a flow chart of a method for converting image content according to an embodiment of the present disclosure. While the flow chart of the method 1100 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry in, for example, a display driving device. Examples of display driving devices include the client devices 106-116 of FIG. 1 and any suitable electronic device(s) implementing one or more of CART 400 of FIG. 4, the architecture 500 of FIG. 5, and the CART system 700 of FIG. 7.

A display driving device, such as a television, video player, or the like, is configured to convert image content of a first resolution for display on a device having a display resolution that is greater than the first resolution. The content may be converted and displayed at the display resolution or a second resolution that is greater than the first resolution but less than the display resolution. For example, in block 1105 an input image is obtained for conversion from a first resolution to a second resolution that is greater than the first resolution. Example methods for performing block 1105 are described in greater detail above in connection with block 405 of FIG. 4 and block 710 of FIG. 7. In block 1110, a first value $\hat{X}_1$ corresponding to a lost high-frequency component (HFC) of the input image is generated and an initial component of an output image is generated in block 1115. For example, reference pyramid computation block 405 generates reference image pyramid including: in block 1115, the initial component ($\hat{I}_1$) which is an initial estimate or guess of $I_1$ corresponding to a base layer of the output image; and the down-sampled image of $I_0$, namely $I_{-1}$. In block 1120, a patch of the input image is selected. For example, in block 1120, cross-scale in-place learning block 420 determines the best matched patch pair between scale 1 and scale 0 by cross-scale matching, the cross-scale in-place learning block 425 determines the best-matched patch pair between scale 0 and scale −1, namely $X_0$ and $X_{-1}$ and HFC patch regression block 430 estimates $\hat{X}_1$, with Taylor regression. In block 1125, lost, or not recovered, HFC of the patch of the initial component is estimated, such as by HFC compensation block 435, as a function of a portion of the lost HFC of the input image that corresponds to the selected patch. The HFC compensation block 435 obtains the estimation of the UHD image $\tilde{I}_1$ in block 1130 and, thus, generates the output image.

Thereafter, a processor or display device interface in the CARTS system provides the converted first image with the recovered spatial frequency for display on a display device.

In certain embodiments, the system (e.g., CARTS 400, 700) is configured to determine whether to perform the method 1100. The determination can be based on a number of considerations. For example, the system can selectively perform the method 1100 based on comparing the resolution of the input video content and the display resolution. For example, in response to a request to render input video content, the system determines the resolution of the input video content by accessing metadata associated with the video content or based on the resolution of a frame of the input video content. The system can determine the display resolution based on metadata stored in firmware (e.g., stored in storage 215) and/or, in some example embodiment, based on the dimensions of the graphical user interface window that is to render the video content. In response to a determination that the video content is less than the resolution of the display resolution, the system determines the factor for up-conversion (e.g., based on the ratio of the video content resolution and the display resolution) and performs the method 1100 using the determined factor.

Additionally or alternatively, the system can determine to perform the method 1000 based on other consideration in alternative embodiments. Example considerations include, but are not limited to, the system having the power capacity of performing the method 1100 (e.g., not operating in a low-power state), the system having the computational bandwidth for performing the method 1100, the system having the communication bandwidth to transmit the upscaled video content, and any suitable condition. The condition of the power capacity can be based on the power cost of performing the method 1100 (e.g., determined based on data stored in the storage 215) and the duration of the input video content.

Additionally or alternatively, the system can determine to perform the method 1000 in response to events other than the receiving of a request to render input video content. For example, the system, while rendering input video content with or without performing the method 1100, can perform the determination in response to a resizing of the GUI window for rendering the video content or dynamic changes in display devices (e.g., user causing the system to stream video content to a second device). In such an embodiment, the system can apply the method 1100 dynamically in response to changing viewing conditions.

Accordingly, certain embodiments of the present disclosure, recover the high frequency components (HFC) that are not recovered during up-sampling from input images instead of synthesizing contents from content dictionaries like is done in EBSR algorithms. Certain embodiments of the present disclosure introduce in-place matching in cross-scale HFC self-learning; thus greatly improve the efficiency. Certain embodiments of the present disclosure synthesize the HR level HFC with a LR to HR HFC projection function, which is expressed as content-adaptive Taylor expansion at the LR level estimated HFC, which greatly boosts image details in the up-sampled images. In certain embodiments of the present disclosure, a completely non-iteration based framework that friendly to hardware implementation is utilized wherein no complex computation is involved. Certain embodiments of the present disclosure effectively regain the sharpness and clearness of both strong edges and delicate textures, at the same time, protect their naturalness, natural blur and weak structures. Certain embodiments of the present disclosure provide an apparatus, system or method sensitive to weak textures, and that can recover very weak and delicate structures from input images, and make the just perceptible contents in the input images more significant and perceptible in the up-sampled images. Certain embodiments of the present disclosure provide an apparatus, system or method that is very efficient, perform with no iteration involved, about are about twelve (12) times faster than the fastest up-to-date state-of-the-art EBSR techniques, while at the same time, obtaining better visual quality than the EBSR. Certain embodiments of the present disclosure provide an apparatus, system or method that is very economic with few or no complex computations, such as exponential or logarithmic computation. Certain embodiments of the present disclosure provide an apparatus, system or method that is robust to multiple image contents and performs stably in real-world applications.

As stated above, the symbol $X_*$, such as $X_{-1}$, $X_0$, $X_1$, and so forth, denotes an HFC map. Furthermore, in software/hardware implementation, image patches can be adopted alternatively, and symbols of patches are denoted by $P_0(x^*)$, which means the patches of HFC map located in scale * and determined by the position x*.

None of the description in this application should be read as implying that any particular element, step, or function is an essential element that must be included in the claim scope. The scope of patented subject matter is defined only by the claims. Moreover, To aid the Patent Office and any readers of any patent issued on this application in interpreting the claims appended hereto, applicants wish to note that they do not intend any of the appended claims or claim elements to invoke 35 U.S.C. §112(f) unless the words "means for" or "step for" are explicitly used in the particular claim. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus comprising:
    a display device interface configured to provide image content having a first resolution to a display device having a display resolution greater than the first resolution; and
    one or more processors configured to convert an input image from the first resolution to a second resolution, the second resolution being greater than the first resolution, wherein to convert the input image from the first resolution to the second resolution, the one or more processors are configured to:
        generate a first value corresponding to a lost high-frequency component (HFC) of the input image, wherein to generate the first value, the one or more processors is configured to remove a low frequency component of the input image by subtractive combination of the low frequency component of an estimated input image from the input image;
        generate an initial component of an output image;
        select a patch of the initial component;

estimate a lost HFC of the patch of the initial component from a patch of the first value, a patch of a HFC portion of the input image, and a patch of an approximation of the HFC of the input image, wherein each patch corresponds to the selected patch; and generate the output image as a function of a sum of the patch of the initial component and the estimated lost HFC of the patch of the initial component.

2. The apparatus according to claim 1, wherein the one or more processors are further configured to estimate the lost HFC of the patch of the initial component from a first derivative of the patch of the approximation of the HFC of the input image.

3. The apparatus according to claim 1, wherein to generate the initial component, the one or more processors are configured to up-sample the input image by a factor.

4. The apparatus according to claim 1, wherein to select the patch, the one or more processors are configured to apply cross-scale in-place learning between the initial component and the input image to determine the most similar image patches between different scales.

5. The apparatus according to claim 1, wherein the one or more processors are configured to perform a prior-probability-based image super-resolution (SR) up-sampling for image enhancement that is deployed by an ultra-high definition display to convert standard or full high-definition video to ultra-high definition video in real-time.

6. The apparatus according to claim 1, wherein the first resolution comprises an ultra-high definition comprising a display format having a 16:9 ratio with at least one digital input cable carrying a minimum resolution of 3,840×2,160 pixels.

7. The apparatus according to claim 1, wherein the one or more processors are configured to:
provide the generated output image to the display device interface on the display device; or
control the display device to display the output image.

8. A non-transitory computer readable medium embodying a computer readable program code that, when executed by a processor, cause the processor to:
convert an input image from a first resolution to a second resolution, the second resolution being greater than the first resolution, wherein to convert the input image from the first resolution to the second resolution, the computer readable program code, when executed by a processor, further cause the processor to:
generate a first value corresponding to a lost high-frequency component (HFC) of the input image, wherein to generate the first value, the computer readable program code is configured to cause the processor to remove a low frequency component of the input image by subtractive combination of the low frequency component of an estimated input image from the input image;
generate an initial component of an output image;
select a patch of the initial component;
estimate a lost HFC of the patch of the initial component from a patch of the first value, a patch of a HFC portion of the input image, and a patch of an approximation of the HFC of the input image, wherein each patch corresponds to the selected patch; and
generate the output image as a function of a sum of the patch of the initial component and the estimated lost HFC of the patch of the initial component.

9. The non-transitory computer readable medium according to claim 8, wherein to estimate the lost HFC of the patch of the initial component is further from a first derivative of the patch of the approximation of the HFC of the input image.

10. The non-transitory computer readable medium according to claim 8, wherein to generate the initial component, the computer readable program code causes the processor to up-sample the input image by a factor.

11. The non-transitory computer readable medium according to claim 8, wherein to select the patch, the computer readable program code causes the processor to apply cross-scale in-place learning between the initial component and the input image to determine the most similar image patches between different scales.

12. The non-transitory computer readable medium according to claim 8, wherein the computer readable program code comprises a plurality of instructions for a prior-probability-based image super-resolution (SR) up-sampling for image enhancement that is deployed by an ultra-high definition display to convert standard or full high-definition video to ultra-high definition video in real-time.

13. The non-transitory computer readable medium according to claim 8, wherein the second resolution comprises an ultra-high definition comprising a display format having a 16:9 ratio with at least one digital input cable carrying a minimum resolution of 3,840×2,160 pixels.

14. The non-transitory computer readable medium according to claim 8, wherein the computer readable program code causes the processor to:
provide the generated output image to a display device interface on a display device having the second resolution; or
control the display device to display the output image.

15. A method for converting image content, the method comprising:
obtaining an input image for conversion from a first resolution to a second resolution, the second resolution being greater than the first resolution;
generating a first value corresponding to a lost high-frequency component (HFC) of the input image, wherein generating the first value comprises removing a low frequency component of the input image by subtracting the low frequency component of an estimated input image from the input image;
generating an initial component of an output image;
selecting a patch of the initial component;
estimating a lost HFC of the patch of the initial component from a patch of the first value, a patch of a HFC portion of the input image, and a patch of an approximation of the HFC of the input image wherein each patch corresponds to the selected patch; and
generating the output image as a function of a sum of the patch of the initial component and the estimated lost HFC of the patch of the initial component.

16. The method according to claim 15, wherein estimating the lost HFC of the patch of the initial component is further estimated from a first derivative of the patch of the approximation of the HFC of the input image; and
wherein generating the initial component comprises up-sampling the input image by a factor.

17. The method according to claim 15, selecting the patch comprises applying cross-scale in-place learning between the initial component and the input image to determine the most similar image patches between different scales.

18. The method according to claim 15, wherein converting comprises performing a prior-probability-based image super-resolution (SR) up-sampling for image enhancement that is deployed by an ultra-high definition display to convert standard or full high-definition video to ultra-high definition video in real-time.

19. The method according to claim 15, wherein the second resolution comprises an ultra-high definition comprising a display format having a 16:9 ratio with at least one digital input cable carrying a minimum resolution of 3,840×2,160 pixels.

20. The method according to claim 15, further comprising at least one of:
   providing the generated output image to a display device interface on a display device; or
   controlling the display device to display the output image.

* * * * *